March 13, 1956     E. BRICHARD     2,737,807
APPARATUS FOR MEASURING THE LEVEL OF THE
MOLTEN GLASS IN TANK FURNACES
Filed July 30, 1951
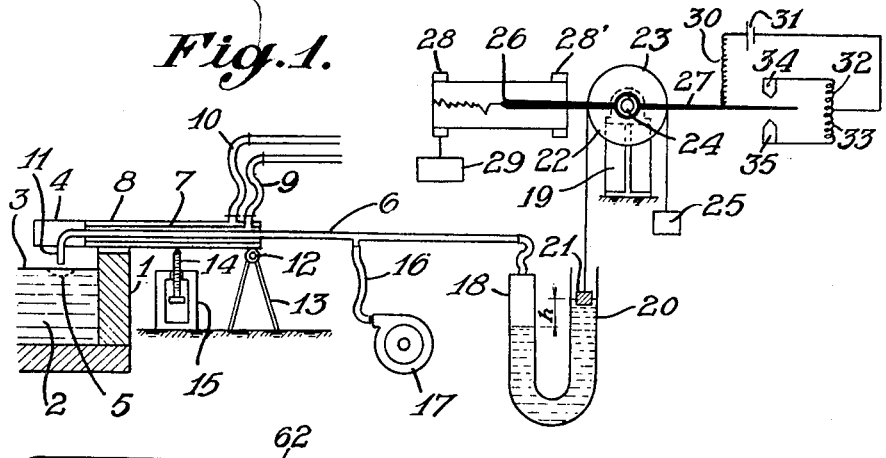
INVENTOR.
Edgard Brichard
By George H. Corey
ATTORNEY

United States Patent Office 2,737,807
Patented Mar. 13, 1956

2,737,807

APPARATUS FOR MEASURING THE LEVEL OF THE MOLTEN GLASS IN TANK FURNACES

Edgard Brichard, Jumet, Belgium, assignor to Union des Verreries Mecaniques Belges S. A., Charleroi, Belgium, a Belgian company Application July 30, 1951, Serial No. 239,237

Claims priority, application Belgium September 7, 1950

9 Claims. (Cl. 73—290)

The present invention relates to an apparatus for measuring the level of viscous liquids, and especially the level of the molten glass bath in tank furnaces.

Optical devices (level gauges) are known, but these are not suitable either for recording the readings or for regulating the means for charging glass furnaces. In other arrangements, the level is regulated by means of a member placed in contact with the glass, but this member is always subject to more or less pronounced wear, whereby very appreciable measurement errors are caused when the arrangement has been in use for some time.

It is the object of this invention to obviate such inconveniences.

According to the invention, a jet of gas, preferably cooled, is directed on to a point of the surface of the molten glass and the variations in the level of the glass are measured as a function of the pressure variations induced in the delivery of gas by these variations in level. For this purpose, use in made of a nozzle through which a current of air or of other relatively cold gas passes with a substantially constant delivery, and the end of which is placed in the neighbourhood of the surface of the glass above the cooled zone so as to direct the jet of air on to the latter.

The pressure which is set up in the nozzle is a function of the distance between the orifice of the nozzle and the locally cooled surface of the bath. Accordingly the measurement of this pressure constitutes a measurement of the level of the glass. The variations in this pressure may also be employed to regulate by means of suitable devices the speed of the members for charging the material to be melted, so as to maintain a constant ratio between the quantity charged and the weight of glass extracted from the tank.

In the accompanying drawings, Figure 1 is a diagrammatic overall view of the apparatus for measuring and regulating the level of the molten glass, Figure 2 shows a variant of this apparatus, Figure 3 is a horizontal section on the line III—III of Figure 2, and Figure 4 shows another embodiment of the apparatus.

In Figure 1, the tank 1 is shown, in which the molten glass 2 rises to the level 3. A small zone 5 of the glass surface is cooled by the proximity of a water circulation casing 4 fed by two concentric pipes 7 and 8 branched off from a water supply system by two flexible pipes 9 and 10 respectively.

Extending into the interior of the pipe 7 and of the casing 4 is a third concentric pipe 6 through which a current of air or gas passes with a constant delivery, coming for example from a fan 17 through a flexible duct 16. The pipe 6 is terminated by a nozzle 11 which opens above the cooled zone 5. Under the effect of the jet of air or gas leaving the nozzle 11, the glass surface is curved inwardly and assumes the form of a depression as shown by the broken line at 5.

The combination of concentric pipes 6, 7, 8 is mounted on a horizontal pivot 12 provided on a support 13 fixed to the ground, permitting the pipes to rock about the pivot 12. These pipes rest at the other end on an adjustment screw 14 mounted on a fixed stirrup 15 to allow of exactly adjusting the position of the nozzle 11 with respect to the surface 3 of the glass bath 2.

The end of the pipe 6 remote from the nozzle 11 communicates with a device adapted to measure the pressure obtaining in the pipe 6, for example a U-shaped manometric tube 18, 20 containing water up to a certain level. The pressure obtaining in the pipe 6 in communication with the arm 18 is balanced by the water column of height $h$ in the arm 20. This height $h$, which constitutes the measure of the said pressure, will therefore vary in accordance with any fluctuations in the latter.

A float 21 placed on the water in the tube 20 is suspended from a flexible wire 22 which passes over a pulley 23 to which it is attached to prevent relative sliding. The pin 24 of the pulley is arranged to oscillate freely on a bearing 19 and the weight of the float 21 is balanced by a counter-weight 25 attached to the second side of the wire 22.

A needle 26, 27 is rigidly secured to the pin 24 to record the pressure and to regulate the glass level.

The arm 26 of the needle carries an inked stylus against which travels a graduated paper tape stretched between two rollers 28, 28' controlled by a clockwork movement 29.

The arm 27 has at its end an electric contact connected by a wire 30 to a source of electric energy 31, the other pole of which is connected to two relays 32, 33 carrying contacts 34, 35 respectively, so that when the needle pivots about its pin 24, the arm comes into contact with the terminal 34 or with the terminal 35 according to the direction of rotation, thus closing the electric circuit of the relay 32 or of the relay 33. These two relays, of type known per se, are so arranged that the first controls the acceleration and the second the speed reduction of the motor driving the arrangement for charging the raw materials into the tank furnace.

The arrangement hereinbefore described operates as follows: under the action of the jet of gas or air leaving the nozzle 11 at a certain speed, the surface of the bath is locally depressed to form a hollow having approximately the form shown by the broken line at 5.

If the level 3 of the glass rises, it moves nearer to the nozzle 11 and the pressure due to the impact of the air jet on the glass rises and produces an increase in the pressure of the fluid in the pipe 6 on the upstream side of the nozzle 11. If the level falls, the said pressure decreases. It is thus possible to utilize the measure of the pressure on the upstream side of the nozzle 11 as a means for measuring the distance between the glass and the nozzle.

The variations in the level of glass thus create pressure variations in the nozzle 6, and consequently variations in the water level in the tube 20. These variations bring about a displacement in one direction or the other of the float 21 and consequently of the needle 26—27. By means of the arm 26, the variations in the level of glass can be recorded on the paper tape. The arm 27 comes into contact with the terminal 34 or with the terminal 35 according to the case, whereby the speed of the motor of the charging arrangement is increased or reduced by the action of the relays 32 or 33. Thus, the quantity of materials charged is increased or reduced and the variations in the level of glass in the tank are compensated for.

Naturally, certain conditions must be fulfilled in the operation of the apparatus: The glass being relatively fluid, the surface swept by the gas jet tends to become wrinkled and to be continuously deformed. In this case, the pressure is not stable, and the measurements are irregular. Hot projected glass may become attached to the nozzle and impede the operation.

For this reason, in accordance with the invention, the surface of the bath is cooled at the point at which it is desired to measure the level. In the embodiment hereinbefore described, the cooling is effected by means of the water circulation casing 4 which absorbs some of the heat of the zone which it covers and also by the action of the air jet which is cooled as it passes through the pipes 7 and 8.

It is also possible to produce a similar effect by thermally insulating the point of measurement from the remainder of the atmosphere of the furnace by providing around it a partially sealed space such as is shown in Figures 2 and 3.

In this embodiment, a ring of refractory material 36 partially immersed in the molten glass 2 surrounds a volume of glass 37 and practically insulates the surface of the latter from the atmosphere of the furnace due to a widened portion 38 provided at the end of the water jacket formed by the pipes 8 and 7, which may be protected by a heat-proof casing 8'. The widened portion 38 is traversed by cooling water and exerts a cooling effect on the glass situated within the ring 36. The said portion has in addition a vent 39 which permits the air leaving the nozzle 11 to escape from the enclosure formed by the ring 36 and the widened portion 38.

In order to protect the nozzle 11 from the effect of the heat radiation of the molten glass, it is preferable to protect it externally by a coating of heat-proof refractory material, except in the part radiating towards the measuring zone 5.

Another arrangement is shown in Figure 4. This comprises, as in Figure 2, the pipes 6, 7 and 8, the widened portion 38 and the nozzle 11. Below the said nozzle is situated a disc of refractory material 58 floating on the glass. The jet of gas leaving the nozzle 11 impinges on the said disc 58, which has vents 59 to permit the jet to escape. The disc 58, which thus constitutes an amplifying member, is centered in relation to the nozzle 11 by means of a recess 60 in said disc, in which fits an extension 61 of the widened portion 38 which is arranged to slide in the recess 60. Owing to the circulation of water in the widened portion 38, and to the gas jet the disc 58 is cooled, whereby the corrosion thereof by the molten glass is reduced. The widened portion 38 is here less wide than in the case of Figure 2. It covers only the disc 58 and exerts no cooling action on the ring 36.

It has been found that the variations of the pressure obtaining in the furnace may cause correlative variations in the pressure induced in the pipe 6, and falsify the readings of the manometer.

In order to obviate this, it is sufficient to insulate the tube 20 from the atmosphere, and to connect it through an individual duct to the atmosphere surrounding the furnace, for example through a pipe such as 62 (Figure 2), which may lead into the furnace in the vicinity of the casing 4, or is directly connected to the vent 39 or 59 and is in this case provided in turn with a cooling jacket in its portion which is introduced into the furnace.

When the vent 39 or 59 is thus connected to the arm 20 of the manometer, it is not possible to connect the float 21 to an indicating instrument through the cable 22. The U-shaped manometer 18—20 is then replaced by an instrument such as a pendulous toroidal pressure gauge 63 of known type (Fig. 2), mounted on the pin 24 of the needle 26—27 and connected at one end to the pipe 6 and at the other end to the vent 39 by the pipe 62.

The vent 39 or 59 may also be simply connected to the atmosphere, whereby the effect of the variations of the pressure of the furnace is also eliminated.

In both cases, the pressure differences indicated by the manometer will accurately represent the variations of the level of the bath.

The system of regulation hereinbefore described is set in operation when the level 3 has moved through a sufficient distance for the needle 27 to come into contact with one of the terminals 34 or 35. At this instant, the accelerating or retarding action on the motor of the charging arrangement is continuously exerted until the level 3 moves in the opposite direction to the variation and breaks the contact between the needle 27 and one of the terminals 34 or 35. This is an absolute regulation.

I claim:
1. In an apparatus for measuring and regulating the level of molten glass in tank furnaces in which a gas jet is directed on to the surface of the molten glass; in combination, a pipe provided with a nozzle mounted above said molten glass, means for supplying gas at a constant rate to said pipe, pressure measuring means in association with said pipe, and means disposed adjacent the nozzle end for reducing the deformation of the molten glass surface at the point toward which said nozzle is directed.

2. An apparatus as claimed in claim 1 comprising means for cooling said gas in said nozzle, and means independent of said cooled gas for cooling said surface, whereby said deformation is reduced by said cooled gas and said independent cooling means.

3. An apparatus as claimed in claim 2 wherein said gas cooling means comprises a cooling jacket surrounding said pipe and nozzle, and said independent cooling means comprises an enlargement of said jacket surrounding said nozzle adjacent the end thereof and located directly above and over an extended area of said surface.

4. An apparatus as claimed in claim 3 comprising also a shield contacting the glass surface and enclosing the area below and around said nozzle and the corresponding glass surface.

5. An apparatus as claimed in claim 4 wherein said enclosed area is practically isolated from the furnace atmosphere by said jacket enlargement which extends nearly to the walls of said shield and said enlargement is provided with a vent for the escape of gas from said nozzle.

6. An apparatus as claimed in claim 3 comprising also a float between said nozzle and glass surface, and means for vertically guiding said float.

7. An apparatus as claimed in claim 6 wherein said float is refractory, encloses the outlet of said nozzle, and is provided with a vent for the escape of gas from said nozzle, and said jacket enlargement extends over the area defined by said float.

8. In an apparatus for measuring and regulating the level of molten glass in tank furnaces in which a gas jet is directed onto the surface of the molten glass; in combination, a pipe provided with a nozzle mounted above said molten glass, means for supplying gas at a constant rate to said pipe, pressure measuring means in association with said pipe, connecting means between said pressure measuring means and said tank furnace near said nozzle to compensate for pressure changes in said tank furnace, and means disposed adjacent the nozzle end for reducing the deformation of the molten glass surface at the point toward which said nozzle is directed.

9. In an apparatus for measuring and regulating the level of molten glass in tank furnaces in which a gas jet is directed onto the surface of the molten glass; in combination, a pipe provided with a nozzle mounted above said molten glass, means for supplying gas at a constant rate to said pipe, pressure measuring means in association with said pipe, venting means connecting said tank furnace near said nozzle to the atmosphere to insure a constant pressure near said nozzle in said tank furnace, and means disposed adjacent the nozzle end for reducing the deformation of the molten glass surface at the point toward which said nozzle is directed.

(References on following page)

References Cited in the file of this patent

UNITED STATES PATENTS

| | | |
|---|---|---|
| 1,927,750 | Mennesson | Sept. 19, 1933 |
| 1,941,897 | Hiller | Jan. 2, 1934 |
| 1,977,969 | McIntosh | Oct. 23, 1934 |
| 2,032,016 | Hitner | Feb. 25, 1936 |
| 2,331,208 | Ludi | Oct. 5, 1943 |
| 2,343,549 | Groghan | Mar. 7, 1944 |
| 2,380,436 | Holdman | July 31, 1945 |
| 2,398,958 | Pellettere | Apr. 23, 1946 |
| 2,585,607 | Whitmore et al. | Feb. 12, 1952 |
| 2,656,611 | O'Neill | Oct. 27, 1953 |